J. R. BYLER.
Harvester Rake.
No. 30,786.
Patented Nov. 27, 1860.
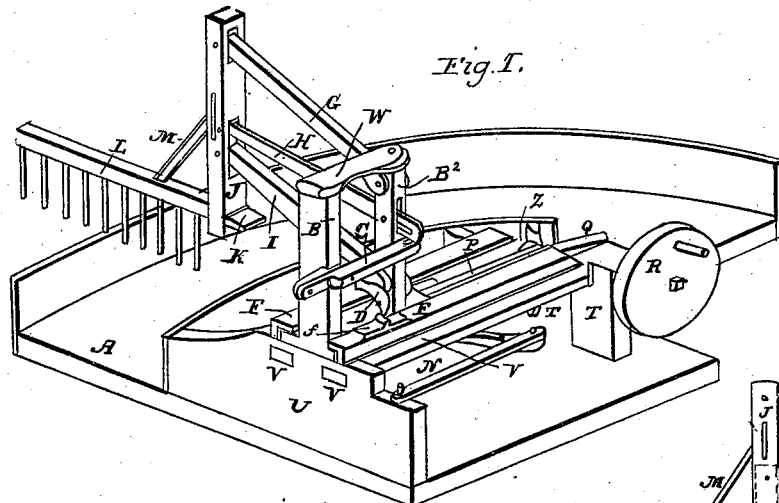
Fig. 1.
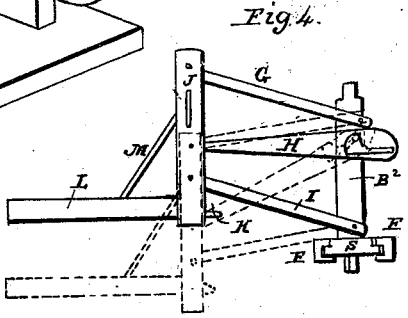
Fig. 4.
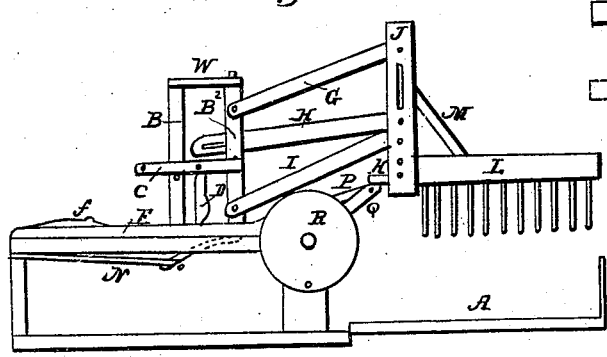
Fig. 2.
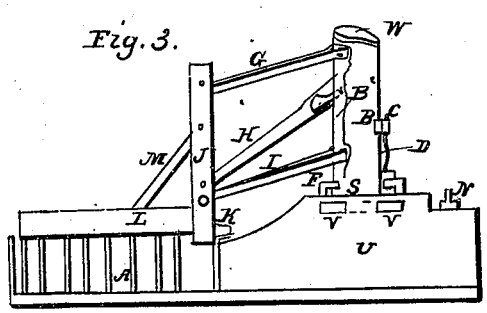
Fig. 3.
Fig. 6.
Fig. 5.
Witnesses.
Inventor.

UNITED STATES PATENT OFFICE.

JACOB R. BYLER, OF SALISBURY, LANCASTER COUNTY, ASSIGNOR TO HIMSELF AND HUGH W. BLACK, OF LANCASTER COUNTY, PENNSYLVANIA.

IMPROVEMENT IN RAKES FOR REAPING-MACHINES.

Specification forming part of Letters Patent No. 30,786, dated November 27, 1860.

*To all whom it may concern:*

Be it known that I, JACOB R. BYLER, of Salisbury township, in the county of Lancaster and State of Pennsylvania, have invented a new and improved combination for operating automaton raking attachments to reaping-machines, adapted to long platforms, used when the cutting-bar and sickles are near the front of the machine; and I do hereby declare that the following is a full, clear, and exact description of the construction and operation of the same, reference being had to the accompanying drawings, making a part of this specification, in which—

Figure 1 is a perspective view of all its parts and application to the platform A. Fig. 2 is a side elevation, with the rake raised; Fig. 3, the same reversed, with the rake down on the platform. Fig. 4 illustrates the change of position of the rake and its connections from the black to the red outlines when up and down. Fig. 5 shows the cranks and connections operating the rocker-shaft $B^2$ and cross-head base S, more fully described as follows:

The frame U and uprights T support the horizontal and parallel guides F F, having each a groove on the inner side, in which the cross-head-like base S slides back and forward by means of the connecting-rod P and crank-arm Q, attached to the axle of the driving-wheel R. This base S supports an upright, B, having a top, W, in which and the said base L a vertical rocker-shaft, $B^2$, has its bearings and receives motion by means of an independent crank-arm, O, attached to its projecting lower end, the other end of the arm O being affixed to a connecting-rod, N, by means of a pin, the other end of said rod N being attached by a pin to the frame U, as shown. The crank and connecting rods, one attached to the cross-head carrying the rocker-shaft with it in its motions back and forth, while the other, attached to the rocker-shafts, turns it partially alternately to the right and left, thereby giving it the necessary double motion for operating the rake over the long or elliptic platform. The upright rake head or support J is connected with the rocker-shaft $B^2$ by two parallel vibrating braces or arms, $G^1$. These arms are bifid at one end, embracing the rocker-shaft and held by pins. The other ends enter slots in the upright rake-head J, and held in place by pins or pivots. Between these two arms $G^1$ there is a shifting-lever, H, fixed in a slot and pivot to J, and having its other end widened, which passes through a slot in the rocker-shaft, in which it moves on a pin adapted to the peculiar slot shown by Fig. 6, for being held above when raised and displaced by the tripper. The upright J sustains the rake L with its brace M. The tripper D is suspended by a peg to the horizontal tripper-arm C, which is pivoted at one end to an arm, E, on the upright B. This tripper in its motions comes in contact with a raised (clipper) edge, *f*, on the top of the guide F, and pushes the arm *c* against the projecting end of the shifting-lever H, dislodging the catch, when the rake drops by its own weight or gravity.

The operation may be briefly stated as follows, viz.: When the rake is drawn back and has completed its sweep, it is brought in a line with the crank and rod O P, on the shackle-pin of which there is a knuckle, Z, which comes in contact with a projection, K, on the inner end of the rake-head, and raises it up, thereby pushing the end of the shifting-lever H through the slot in the rocker-shaft and lodging it in the upper nick of the widened slot, in which it is now held while the rake is being carried in its raised position forward, so that when brought to its proper position the tripper performs its office and the rake drops and sweeps over the platform, effectually clearing it of its contents, to be again raised to repeat the operation by each revolution of the wheel R.

The mechanism is so contrived that no motion is lost, the raising and forward motion, as is also the dropping and raking motion, are simultaneous, and the sliding and turning motion of the rocker-shaft is peculiarly adapted to a long or curvilinear sweep, so much desired when the cutting-bar is on the side in front instead of the rear of the reaper, so objectionable for various reasons, in mowers especially.

I am aware that the vibrating parallel arms, as well as the turning motion of the shaft and crank, are not new, nor do I claim such, independently considered.

What I claim as my invention, and desire to secure by Letters Patent is,—

1. The combined vertical and horizontal tripper D C and arm E, in combination with the peculiarly-slotted shifting-lever H, for operating the up-and-down motion of the rake.

2. The sliding and turning rocker-shaft $B^2$, in combination with the cross-head base S, and independent crank-lever O, and connecting-rod N, together with the grooved guides F F, and clipper-ridge $f$, combined and arranged substantially as set forth, for the purpose specified.

JACOB R. BYLER.

Witnesses:
S. G. MUSSER,
JACOB STAUFFER.